March 2, 1971 — A. DE FEO — 3,567,333

GAS TURBINE BLADE

Filed Jan. 31, 1969 — 2 Sheets-Sheet 1

INVENTOR.
ANGELO DE FEO
BY
Arthur Fredwick
ATTORNEY

INVENTOR.
ANGELO DE FEO
BY
Arthur Frederick
ATTORNEY

United States Patent Office 3,567,333
Patented Mar. 2, 1971

3,567,333
GAS TURBINE BLADE
Angelo De Feo, Totowa Boro, N.J., assignor to
Curtiss-Wright Corporation
Filed Jan. 31, 1969, Ser. No. 795,424
Int. Cl. F01d 5/18
U.S. Cl. 416—90                                    1 Claim

ABSTRACT OF THE DISCLOSURE

An improved transpiration cooled turbine blade comprising a sheath of permeable material surrounding a load-carrying strut, the assembly having a generally airfoil configuration with a concave and convex surface joined by a curved leading edge portion and a trailing edge portion. The strut is provided with lands and grooves with a land portion extending into abutment against the sheath to thereby reinforce the sheath against impaction of gas entrained particles. The land portion is offset from an imaginary longitudinal plane containing the camber line in a direction away from the concave surface of the blade so that cooling fluid can bleed through the sheath at the leading edge portion on both sides of the imaginary longitudinal plane.

BACKGROUND OF THE INVENTION

This invention relates to gas turbine blades and, more particularly, to transpiration cooled blades for turbine engines, which blades have a porous sheath or skin to which pressurized cooling fluid, such as air, is bled to cool such skin. Since transpiration cooled turbine blades have a porous skin which may be composed of metal fabric, or pressed and sintered metal powder, and therefore structurally weak, the sheath is supported on a load-carrying spar or strut. Also since such turbine blades are subject to high temperatures gases, the strut is constructed and arranged to provide cooling fluid flow passageways adjacent the inner surface of the permeable sheath. In turbine blades of this type it has been found difficult to provide for the proper strength to withstand impact blows from solid particles entrained in the gas which impinge against the leading edge portion of the blade as well as cooling of the leading edge portion of the blade.

Accordingly, it is an object of this invention to provide an improved transpiration cooled turbine blade which has a leading edge portion resistant to damage from impacting solid particles entrained in the gas and wherein the entire leading edge portion is cooled to maintain the leading edge portion within a predetermined safe temperature range.

Another object of this invention is to provide an improved transpiration cooled turbine blade having means for more effective cooling of the leading edge of the blade than heretofore known transpiration cooled turbine blades.

PRIOR ART

Transpiration cooled turbin blades of various types are disclosed in the following U.S. Patents:

| | | |
|---|---|---|
| 2,857,657 | Wheeler, Jr. | Oct. 28, 1958 |
| 3,067,982 | Wheeler, Jr. | Dec. 11, 1962 |
| 3,222,774 | Kump et al. | Dec. 14, 1965 |
| 3,224,194 | DeFeo et al. | Dec. 21, 1965 |
| 3,240,468 | Watts et al. | Mar. 15, 1966 |
| 3,402,914 | Kump et al. | Sept. 24, 1968 |

SUMMARY OF THE INVENTION

The present invention contemplates an improved transpiration cooled turbine blade wherein the spar or strut and the skin or sheath surrounding the strut are constructed in a substantial airfoil configuration with a curved leading edge interconnecting the convex and the concave surfaces of the blade. The strut has a land portion formed by spaced longitudinal grooves or channels so positioned as to engage the sheath in the area of the leading edge which is subject to damage due to impact of solid particles thereon. The land is also offset from the camber line of the blade to provide a cooling fluid passageway at the leading edge which extends on both sides of an imaginary longitudinal plane containing the camber line of the blade so that flow of cooling fluid is provided, through the sheath at the leading edge, along the outer surface of the leading edge.

BRIEF DESCRIPTION OF THE DRAWINGS

The invention will be more fully understood from the following description when considered in connection with the accompany drawings in which.

DESCRIPTION OF THE PREFERRED EMBODIMENT

Figure 1:
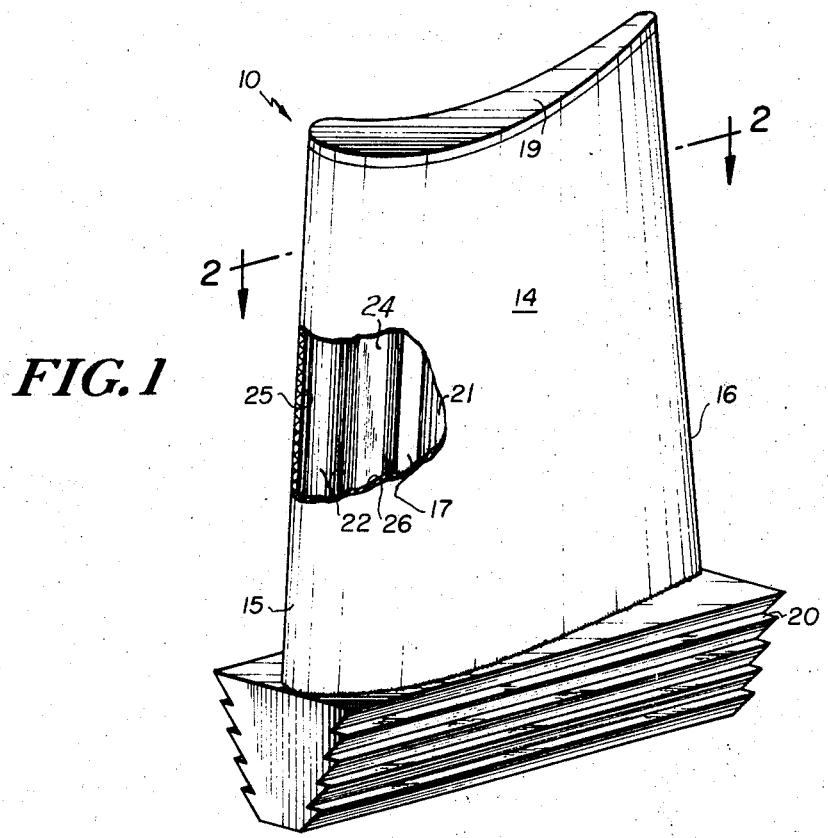
FIG. 1 is a perspective view of the transpiration blade, according to this invention, with parts broken away for purposes of illustration only.
Figure 2:
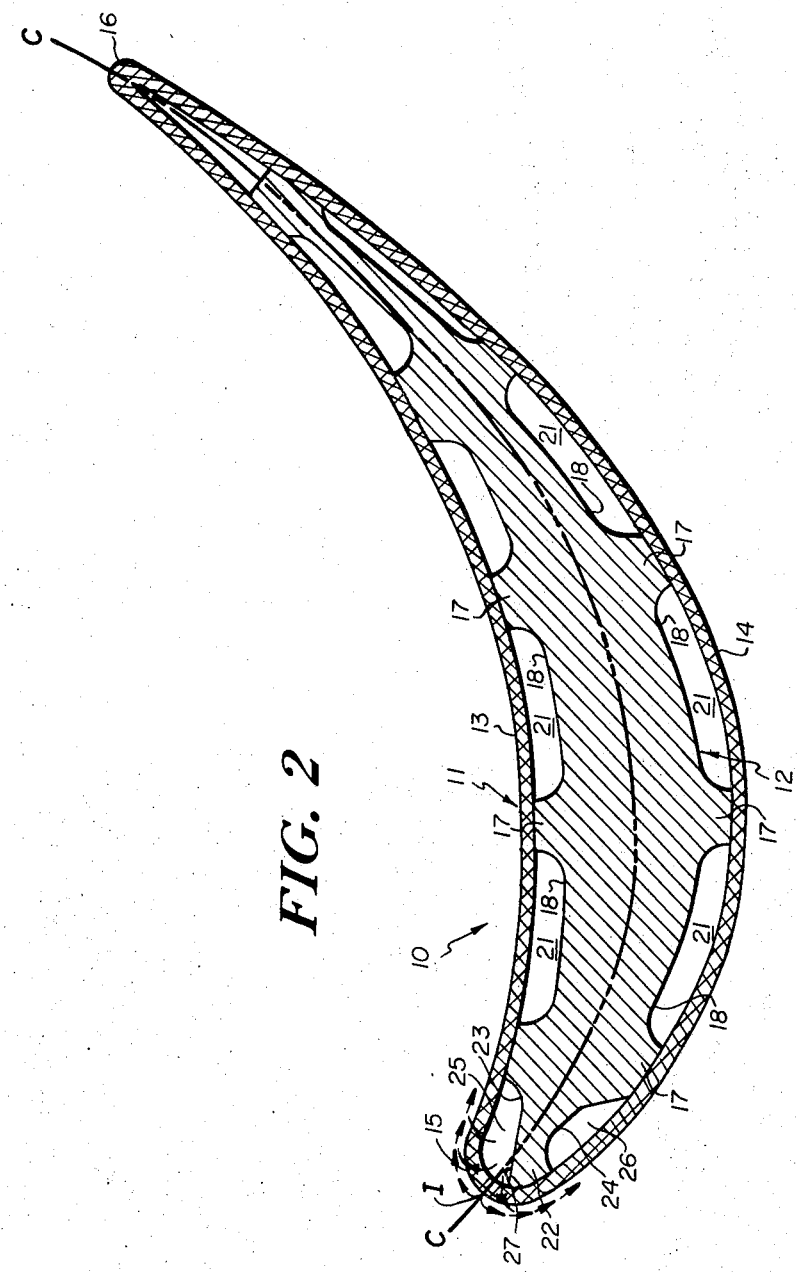
FIG. 2 is a cross-sectional view taken substantially along line 2—2 of FIG. 1, somewhat enlarged.

Now referring to the drawing and, more specifically to FIGS. 1 and 2, reference number 10 generally designates the transpiration cooled turbine blade according to this invention, which blade, preferably, has a substantially airfoil configuration. The blade 10 has a particular application to the rotor of a turbine combustion engine in which the blades are exposed to extremely high combustion gas temperatures and possible impingement of entrained, comminuted, solid material.

The transpiration cooled turbine blade 10 comprises a skin or sheath 11 of porous material composed of metal fabric, pressed and sintered metal powder, or the like, and a load-carrying spar or strut 12, having a complementary shape to the sheath, disposed within sheath 11. The sheath 11 is of substantially airfoil shape in transverse cross section and has a concave surface portion 13 and an opposite, convex surface portion 14, connected along the edge by a curved leading edge portion 15 and along opposite edges by a trailing edge portion 16. To reinforce sheath 11 and to provide cooling fluid flow passageways, strut 12 is provided with spaced longitudinally extending lands 17 and grooves 18, in the peripheral surface thereof, the lands 17 engaging and being welded, brazed or otherwise suitably secured to the inner surfaces of sheath 11. The distal ends of the blade is occluded by a closure member 19 which is secured to sheath 11 and strut 12 by any suitable means, as for example, welding. The opposite or root end of blade 10 may be closed by a conventional fir-tree root member 20 which is welded or otherwise suitably bonded to sheath 11 and strut 12. The fir-tree root member 20 provides, as is well known to those skilled in the art, a means for securing the blade in the body (not shown) of a turbine rotor.

The fir-tree root member 20 is provided with cooling fluid inlet passageway means (not shown) which communicates at one end, with a source of relatively high pressure cooling fluid, such as the air compressor section of a gas turbine engine (not shown), and at the opposite end with the cooling fluid passageways 21 defined by lands 17, grooves 18 and sheath 11. The cooling fluid is delivered to the passageways at a pressure greater than the ambient combustion gas pressure surrounding the exterior of the blade so that cooling fluid will bleed through the porous sheath and into the combustion gas stream.

The transpiration cooled turbine blade 10, as thus far described, is provided, according to this invention, with a novel strut configuration which cooperates with sheath 11 to render leading edge portion 15 of the turbine blade resistant to impact damage from solid particles entrained in the combustion gas stream and which provides for effectively cooling the entire leading edge portion to thereby prevent burning or melting of the sheath material or damage as a result of the yield strength of the sheath being exceeded. To this end, as best shown in FIG. 2, strut 12 is provided at leading edge portion 15 with a longitudinally extending rib or land 22 which is defined between spaced grooves 23 and 24. The grooves 23 and 24 each define with the adjacent covering sheath portion, a cooling fluid flow passageway 25 and 26, respectively, similar to passageways 21. The land 22 has a surface portion 27 which extends in a plane offset from a longitudinal plane containing camber line C—C of blade 10 and on the side of the camber line C—C remote from concave surface 13. The land 22 is dimensioned to project into abutment with sheath 11 in the area of leading edge portion 15 which is subject to impact blows of relatively large magnitude from entrained solid material. The offset position of surface portion 27 serves to expose leading edge portion 15 of the sheath to coolant fluid in passageway 25 on both sides of the mean line of gas flow impingement against the leading edge portion 15, designated as I in FIG. 2, so that cooling fluid bleeding from the sheath flows along the entire exterior surface of leading edge portion 15, cooling fluid flow being indicated by the arrows.

Figure 3:
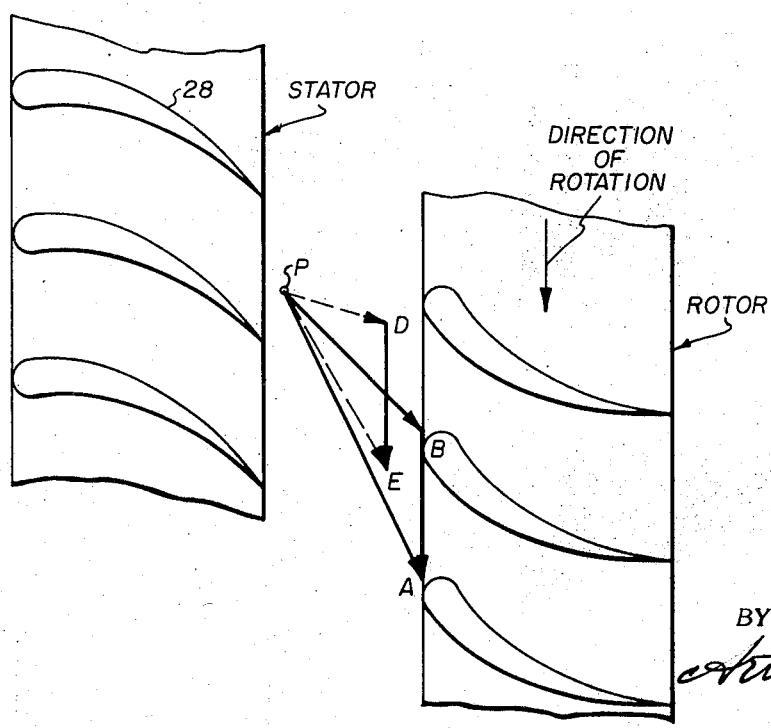
FIG. 3 is a schematic darwing showing the relationship of the turbine rotor blades to the turbine stator blades and including a representative vector diagram illustrating the velocity of gas and entrained solid material flow through the stator and rotor.

As schematically illustrated in FIG. 3, the combustion gas flow emitted from the stator vanes or nozzles 28, in any typical turbine engine design, has a representative absolute velocity vesto P–A and a relative velocity vector P–B with respect to the rotating rotor having a velocity vector B–A. The combustion gas, in flowing through the stator, is substantially accelerated, as for example, from about 200 ft./sec. to about 2,000 ft./sec. Due to the mass of the entrained solid particles and the concomitant greater inertia of the solid particles than the gas, as well as the relatively small distance through the stator and to the rotor, this distance being exaggerated in FIG. 3, the solid particles have lower velocities upon entry into the rotor than the gas and therefore different velocity vectors. As illustrated in FIG. 3 the solid particles have a representative absolute velocity vector P–E and a relative velocity vector P–D with respect to the rotor, the relative velocity vector P–D, as shown, being directed more parallel with rotor axis of rotation than the relative direction of movement of the gas stream as represented by velocity vector P–B. This phenomenon results in the solid particles striking the blade in a direction more normal to the surface of sheath 11 in the area of leading edge portion 15 which is on the convex side of an imaginary longitudinal plane containing camber line C—C than at other areas of the sheath. Accordingly, the impact forces imposed by solid particles on the sheath are greater in this area than the force of impact of like size particles elsewhere on the surface of sheath 11 and have been found frequently to be of a magnitude sufficient to dent and otherwise damage the sheath if the latter is unsupported by strut 12. Therefore, land 22 is positioned and dimensioned to reinforce this leading edge portion which is highly susceptible to impact damage.

In addition to impact forces, the leading edge portion 15 of the blade is exposed to combustion gases at elevated temperatures; as for example, approximately 2,500° F., and therefore it is necessary to cool the leading edge portion of the blade to prevent heat damage to the blade. To accomplish this, groove 23, which partly defines land 22, is so formed that the coolant passageway defined by groove 23 and sheath 11 extends on both sides of a longitudinal plane containing camber line C—C. With the leading edge portion 15 of the sheath exposed to cooling fluid on both sides of the camber line C—C, coolant will flow across the entire surface of leading edge portion 15, thus eliminating any areas of concentrated heat.

It is believed now readily apparent from the foregoing description that an improved transpiration cooled turbine blade has been disclosed which provides for cooling of the entire leading edge portion of the blade as well as reinforcement of the leading edge portion against damage from impinging solid material.

Although but one embodiment of the invention has been illustrated and described in detail, it is to be expressly understood that the invention is not limited thereto. Various changes can be made in the arrangement of parts without departing from the scope and spirit of the invention as the same will now be understood by those skilled in the art.

What is claimed is:

1. A transpiration cooled turbine blade for use in an environment wherein the turbine blade is exposed to hot combustion gases and impacts from comminuted material entrained in the combustion gases, the turbine blade comprising:
  (a) a sheath of permeable material,
  (b) a strut disposed within said sheath and coextensive therewith for reinforcing said sheath,
  (c) said sheath and strut having a generally airfoil configuration having a convex surface and a concave surface joined along one edge by a curved leading edge portion and along an opposite edge by a trailing edge portion,
  (d) the strut having at least two spaced longitudinally extending grooves in the surface thereof at the leading edge portion to define a land having two opposite sides and a distal surface lying in abutment against the inner surface of the sheath at the leading edge portion of the latter to thereby reinforce the sheath against the impact forces of impinging solid matter entrained in the gas stream,
  (e) one of said grooves being so formed that one side of the land portion adjacent the distal surface extends in close spaced offset relationship to an imaginary longitudinal plane containing the camber line on the side of said plane remote from the concave surface of the blade, and
  (f) said one groove defining with the sheath a fluid passageway communicating with a source of cooling fluid to receive the latter and effect bleeding of the cooling fluid through the sheath at the leading edge portion of the blade on both sides of said imaginary longitudinal plane so as to effect cooling of the entire leading edge portion.

References Cited
UNITED STATES PATENTS

| | | | |
|---|---|---|---|
| 2,888,241 | 5/1959 | Stalker | 416—92 |
| 3,067,982 | 12/1962 | Wheeler | 416—90 |
| 3,172,621 | 3/1965 | Erwin | 416—90UX |
| 3,240,468 | 3/1966 | Watts et al. | 416—90UX |
| 3,402,914 | 9/1968 | Kump et al. | 416—231 |
| 3,433,015 | 3/1969 | Sneeden | 416—231UX |

FOREIGN PATENTS

| | | | |
|---|---|---|---|
| 716,612 | 10/1954 | Great Britain | 416—232 |

EVERETTE A. POWELL, Jr, Primary Examiner

U.S. Cl. X.R.

416—97, 233

UNITED STATES PATENT OFFICE
CERTIFICATE OF CORRECTION

Patent No. 3,567,333            Dated March 2, 1971

Inventor(s) ANGELO DE FEO

It is certified that error appears in the above-identified patent and that said Letters Patent are hereby corrected as shown below:

IN THE SPECIFICATION:

Column 1, line 38 "temperatures" should read -- temperature --.

Column 2, line 19 "accompany" should read --accompanyi line 25 the word "darwing" should be corrected to re --drawing--; line 50 "the" should be changed to --on line 57 "ends" should read --end--.

Column 3, line 39 "vesto" should read --vector--.

Column 4, line 41 before "lead-" insert --curved--.

Signed and sealed this 13th day of July 1971.

(SEAL)
Attest:

EDWARD M. FLETCHER, JR.           WILLIAM E. SCHUYLER, JR.
Attesting Officer                    Commissioner of Patents